(12) United States Patent
Atamaniouk (10) Patent No.: US 7,164,685 B2
(45) Date of Patent: Jan. 16, 2007

(54) COOKIES OR LIBERTY ENABLER FOR PROCESSING ALL CONNECTIONS BETWEEN USER/AGENT AND ORIGIN SERVER IN A WIRELESS NETWORK FOR ENABLING COOKIES OR LIBERTY SUPPORT SERVICES FOR USERS/AGENTS

(75) Inventor: Valeri Atamaniouk, Espoo (FI)

(73) Assignee: Nokia Corporation, Espoo (FI)

( * ) Notice: Subject to any disclaimer, the term of this patent is extended or adjusted under 35 U.S.C. 154(b) by 72 days.

(21) Appl. No.: 10/412,622

(22) Filed: Apr. 11, 2003

(65) Prior Publication Data

US 2004/0215739 A1 Oct. 28, 2004

(51) Int. Cl.
*H04L 12/66* (2006.01)
(52) U.S. Cl. .................... 370/401; 709/203
(58) Field of Classification Search ............. 370/401; 709/201, 203, 227; 713/150, 201, 202
See application file for complete search history.

(56) References Cited

U.S. PATENT DOCUMENTS

2003/0061275 A1* 3/2003 Brown et al. .............. 709/203

2003/0177196 A1* 9/2003 Bhasin et al. .............. 709/213
2004/0230820 A1* 11/2004 Hui Hsu et al. ........... 713/200

FOREIGN PATENT DOCUMENTS

WO    WO 99/64967    * 12/1999

OTHER PUBLICATIONS

Liberty Alliance Project. "Introduction to the Libery Alliance Identity Architecture". Mar. 2003. pp. 1-14.*
Liberty Alliance Project "Introduction To The Liberty Alliance Identity Architecture", Mar. 2003, pp. 1-14, fig. 2.

* cited by examiner

*Primary Examiner*—Derrick Ferris (57) ABSTRACT

The invention provides a method and apparatus for enabling cookies-support services, liberty-support services, or a combination thereof, for particular clients, users and/or user agents in a wireless network. The method comprises the step of processing all connections between a client, user or user agent and an origin server through a cookies or liberty enabler to enable full user control over cookies or liberty acceptance and management for an end user. The cookies or liberty enabler may be arranged between the client, user or user agent and the origin server as either a component of a proxy/gateway or built into the origin server.

42 Claims, 8 Drawing Sheets

BLOCK DIAGRAM OF SERVER SIDE COOKIES HANDLING ALGORITHM

FIG.1

COOKIES ENABLER AS COMPONENT OF PROXY/GATEWAY

FIG.2A

COOKIES ENABLER BUILT INTO ORIGIN SERVER

FIG.2B

BLOCK DIAGRAM OF COOKIES ENABLER

FIG.2C

FIG. 2D BLOCK DIAGRAM OF SERVER SIDE COOKIES HANDLING ALGORITHM

LIBERTY ENABLER AS COMPONENT OF PROXY/GATEWAY
FIG.3A

LIBERTY ENABLER BUILT INTO ORIGIN SERVER
FIG.3B

BLOCK DIAGRAM OF LIBERTY ENABLER
FIG.3C

FIG.3D BLOCK DIAGRAM OF SERVER SIDE LIBERTY HANDLING ALGORITHM

LIBERTY ENABLER (VIA COOKIES)
AS COMPONENT OF PROXY/GATEWAY

FIG.4A

LIBERTY ENABLER (VIA COOKIES)
BUILT INTO ORIGIN SERVER

FIG.4B

BLOCK DIAGRAM OF LIBERTY ENABLER (VIA COOKIES)
FIG.4C

FIG.4D BLOCK DIAGRAM OF SERVER SIDE LIBERTY (VIA COOKIES) HANDLING ALGORITHM

COOKIES OR LIBERTY ENABLER FOR PROCESSING ALL CONNECTIONS BETWEEN USER/AGENT AND ORIGIN SERVER IN A WIRELESS NETWORK FOR ENABLING COOKIES OR LIBERTY SUPPORT SERVICES FOR USERS/AGENTS

BACKGROUND OF THE INVENTION

1. Field of Invention

The field of the invention lies in the field of supporting cookies and/or the liberty protocol on the server side whenever UA support is not available or not desirable.

2. Description of Related Art

Recently, it has become possible for mobile terminals, such as mobile phones, personal digital assistance, etc., to access the Internet using a Wireless Application Protocol (WAP), which is a communications protocol and application environment for the deployment of information resources, advanced telephony services and Internet access.

A cookie is a text file stored in memory of a device that has been placed by a website on the Internet that was visited. In a typical client/server environment, a cookie allows the server side of the Internet connection to both store and retrieve information on the client side. One advantage of cookies is that they can automatically identify the client to the server, thereby shortening or eliminating the user identification element of the log-in process. Moreover, a website content provider can use a cookie to identify a particular website page(s) provided to a visitor based on the website provider's evaluation of user preferences during website visit(s) in relation to the cookie. The downside of cookies is that they are placed on the client device without knowledge of the client, giving rise to concerns about privacy through electronic trespass. Besides, the website content provider can use information gathered about the client via cookies to steer and/or modify the website access by the visitor/client based on these real or perceived user preferences.

Currently, there are two types of mobile phones on the market: those that support cookies, and those that do not. For phones that support cookies, a client or user can select if they want to accept them or not. For phones that do not support cookies, a gateway typically stores and accepts them for all users by default. However, this approach presents a problem because cookies could be used for violating the privacy of users and the gateway does not allow them any kind of choice even between enabling this service and disabling it. Another problem is that the phone can support cookies, but their size could exceed the user agent (UA) capabilities to store them. In this case, the gateway may use its own storage to extend the usability of network services. For example, there is a known WAP gateway that has a special module that always accepts and stores cookies for user agents (UA) that do not support them. The component can be completely disabled, but that would affect all users.

Similarly, the Liberty protocol standard is not widely available during Internet based access using WAP. Presently, there are only pilot implementations of Liberty on the UA side. All UAs on the market do not support the Liberty standard. For instance, very few UAs have embedded Liberty support. Most of the presently available UAs (over 99%) do not have it. If the UA does not support the protocol, the service not available.

In view of the aforementioned, there is a need in the wireless network industry for providing cookies-support services, liberty-support services, or a combination thereof, at the discretion and control of particular clients, users and/or user agents in a wireless network.

SUMMARY OF INVENTION

In its broadest sense, the present invention provides a new and unique method and apparatus for enabling cookies-support services, liberty-support services, or a combination thereof, for particular clients, users and/or user agents in a wireless network. The method comprises the step of processing all connections between a client, user or user agent and an origin server through a cookies or liberty enabler to enable full user control over cookies or liberty acceptance and management for an end user. The cookies or liberty enabler would be arranged between the client, user or user agent and the origin server as either a component of a proxy/gateway or built into the origin server.

The invention provides a generic architecture for implementing the handling of cookies and/or liberty protocol on the server side. This implementation enables support for the cookies or the liberty security model without the required support for them from the UA side.

The invention may take the form of a cookies or liberty enabler for enabling cookies-support services, liberty-support services, or a combination thereof, for particular clients, users and/or user agents in a wireless network, wherein the cookies or liberty enabler processes all connections between a client, user or user agent and an origin server through the cookies or liberty enabler.

The invention may also take the form of a proxy/gateway for coupling a client, user or user agent and an origin server in a wireless network, having a cookies or liberty enabler for enabling cookies-support services, liberty-support services, or a combination thereof, for particular clients, users and/or user agents in the wireless network, wherein the cookies or liberty enabler processes all connections between the client, user or user agent and the origin server through the cookies or liberty enabler.

The invention may also take the form of an origin server for providing content to a client, user or user agent in a wireless network via a proxy/gateway, having a cookies or liberty enabler for enabling cookies-support services, liberty-support services, or a combination thereof, for particular clients, users and/or user agents in the wireless network, wherein the cookies or liberty enabler processes all connections between the client, user or user agent and the origin server through the cookies or liberty enabler.

The invention may also take the form of a wireless network having a proxy/gateway for coupling a client, user or user agent to an origin server that provides content, having a cookies or liberty enabler arranged therein for enabling cookies-support services, liberty-support services, or a combination thereof, for particular clients, users and/or user agents in the wireless network, wherein the cookies or liberty enabler processes all connections between the client, user or user agent and the origin server.

The invention may also take the form of a computer program product with a program code, which program code is stored on a computer readable medium, for carrying out the steps of the method when the computer program is run in a processing device in the cookies or liberty enabler.

BRIEF DESCRIPTION OF THE DRAWING

The drawing, not drawn to scale, includes the following figures.

DETAILED DESCRIPTION OF INVENTION

Figure 1:
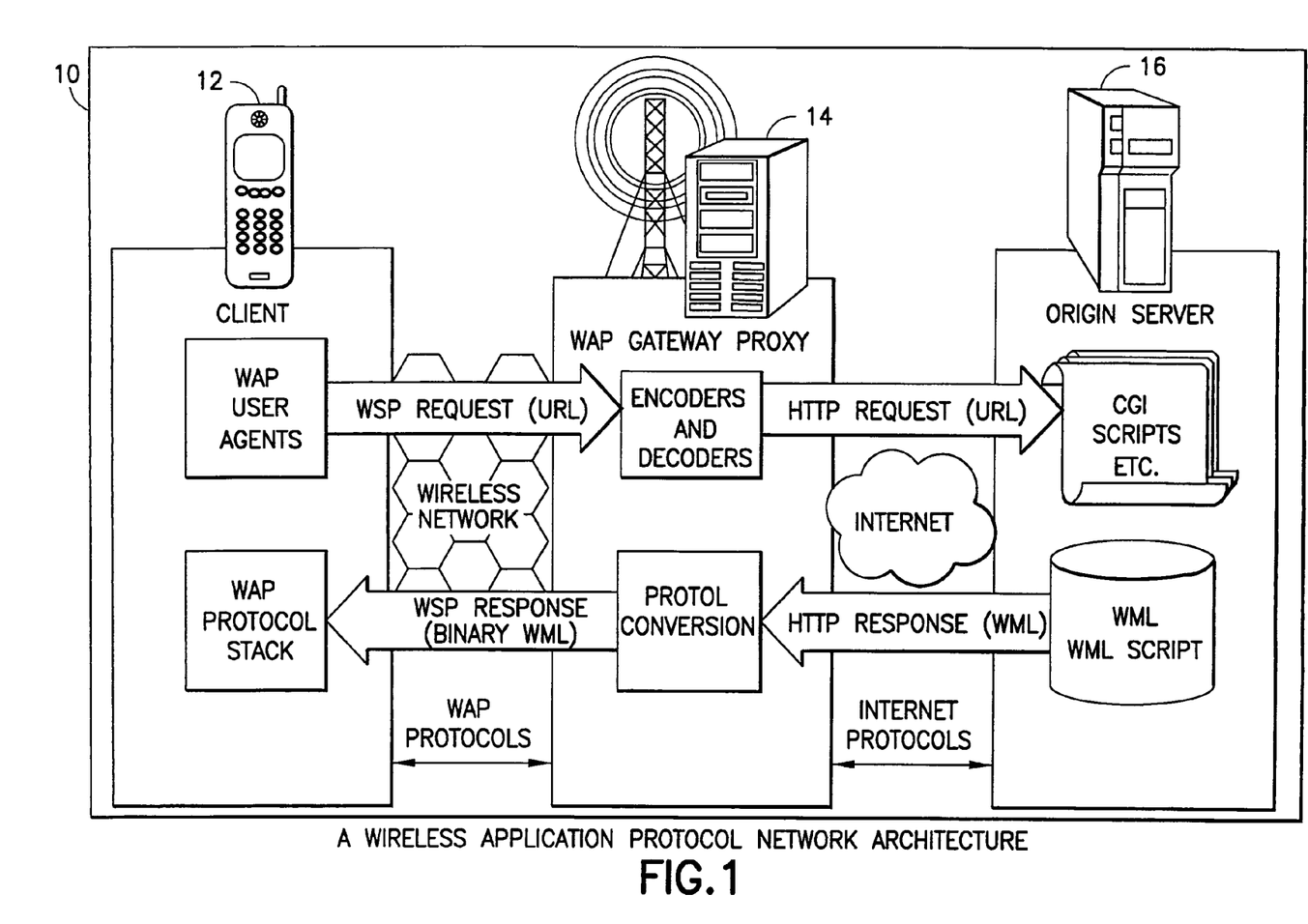
FIG. 1 is a diagram of wireless application protocol network architecture.

FIG. 1: WAP Network Architecture

FIG. 1 shows a wireless application protocol (WAP) network architecture generally indicated as 10, consisting of a client, user or user agent 12, a WAP gateway proxy 14 (also known as a proxy/gateway) and an origin server 16. Typically, the client 12, which may be in the form of a mobile phone, a personal digital assistant (PDA) or other mobile equipment, can access the Internet using the WAP protocol by providing a Wireless Session Protocol (WSP) request with a Universal Resources Locator (URL) to the WAP gateway proxy 14 via wireless communication. The WAP gateway proxy 14 processes the WSP request and provides a Hypertext Transfer Protocol (HTTP) request to the origin server 16 via the Internet. In response to the HTTP request, the origin server 16 provides an HTTP response with content back to the WAP gateway proxy 14 via the Internet. The WAP gateway proxy 14 receives the HTTP response and provides a WSP response to the client 12 with the content.

The invention provides a new and unique method and apparatus for enabling cookies-support services, liberty-support services, or a combination thereof, for particular clients, users and/or user agents 12 in the network shown in FIG. 1. The method comprises the step of processing all connections between the client, user or user agent 12 and the origin server 16 through a cookies or liberty enabler shown and described in detail below to enable full user control over cookies or liberty acceptance and management for an end user, such as the client 12. The cookies or liberty enabler may be arranged between the client, user or user agent 12 and the origin server 16 as either a component of the gateway proxy 14 or built into the origin server 16 in FIG. 1. The steps of the method may be implemented via a computer program running in a processing device in the cookies or liberty enabler.

FIGS. 2A–2D: The Cookies Enabler

Figure 2A:
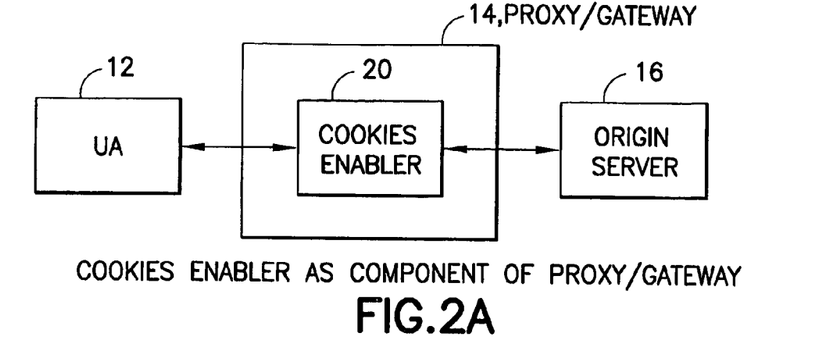
FIG. 2A is a block diagram of a cookies enabler as a component of a proxy/gateway in the network shown in FIG. 1.
Figure 2B:
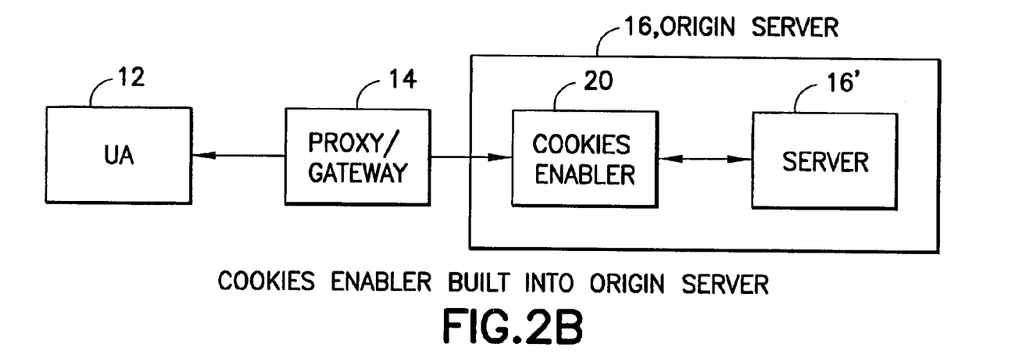
FIG. 2B is a block diagram of a cookies enabler built into an origin server in the network shown in FIG. 1.

FIGS. 2A and 2B show a cookies enabler 20 for enabling cookies-support services for particular clients, users and/or user agents 12 in the wireless network 10 shown in FIG. 1. The UA 12 does not typically have to have cookies support. The cookies enabler 20 processes all connections between the client, user or user agent (UA) and the origin server 16 through the cookies enabler 20 and enables full user control over cookies acceptance and management for an end user 12. The origin server 16 is a facility that provides content and consumes or produces cookies and does not have to be aware of cookies support in UA side.

FIG. 2A shows the cookies enabler 20 implemented in the proxy/gateway 14 for coupling the client, user or user agent 12 and the origin server 16 in the wireless network 10 shown in FIG. 1.

FIG. 2B shows the cookies enabler 20 implemented in the origin server 16 which has a server 16' for providing content to the client, user or user agent 12 in the wireless network 10 shown in FIG. 1 via the proxy/gateway 14.

Figure 2C:
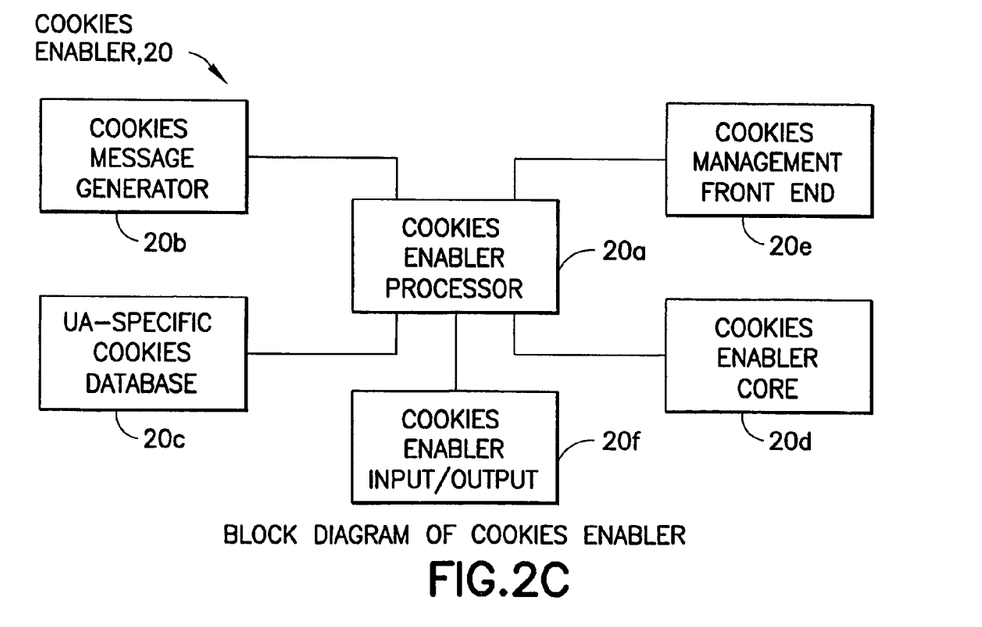
FIG. 2C is a block diagram of the cookies enabler shown in FIGS. 2A and 2B.

FIG. 2C: The Cookies Enabler

FIG. 2C shows a diagram of the cookies enabler 20 having a cookies enabler processor 20a for coordinating a cookies message generator 20b, a UA-specific cookies database 20c, a cookies enabler core 20d, a cookies management front end 20e and a cookies enabler input/output 20f. The cookies enabler core 20d performs the main cookies enabler functions in relation to the client, user or user agent 12 and the origin server 16 consistent with that discussed below with regard to FIG. 2D. The cookies repository or database 20c is responsible not only for storing the cookies, but also for maintaining user preference. The cookies message generator 20b provides cookies messaging functionality in relation to the client, user or user agent 12 and the origin server 16. The cookies management front end 20e provides an interface that allows the user to log in and check his stored cookies and manage them and other relevant cookies settings. The cookies enabler input/output 20f performs the input/output functionality in relation to the client, user or user agent 12 and the origin server 16.

The cookies message generator 20b, UA-specific cookies database 20c, cookies enabler core 20d, cookies management front end 20e and cookies enabler input/output 20f may be implemented using hardware, software, or a combination thereof. The scope of the invention is not intended to be limited to any particular implementation thereof. For example, a typical software implementation may include using a microprocessor architecture having a microprocessor, a random access memory (RAM), a read only memory (ROM), an input/out devices and a control, address and databus for connecting the same.

Figure 2D:
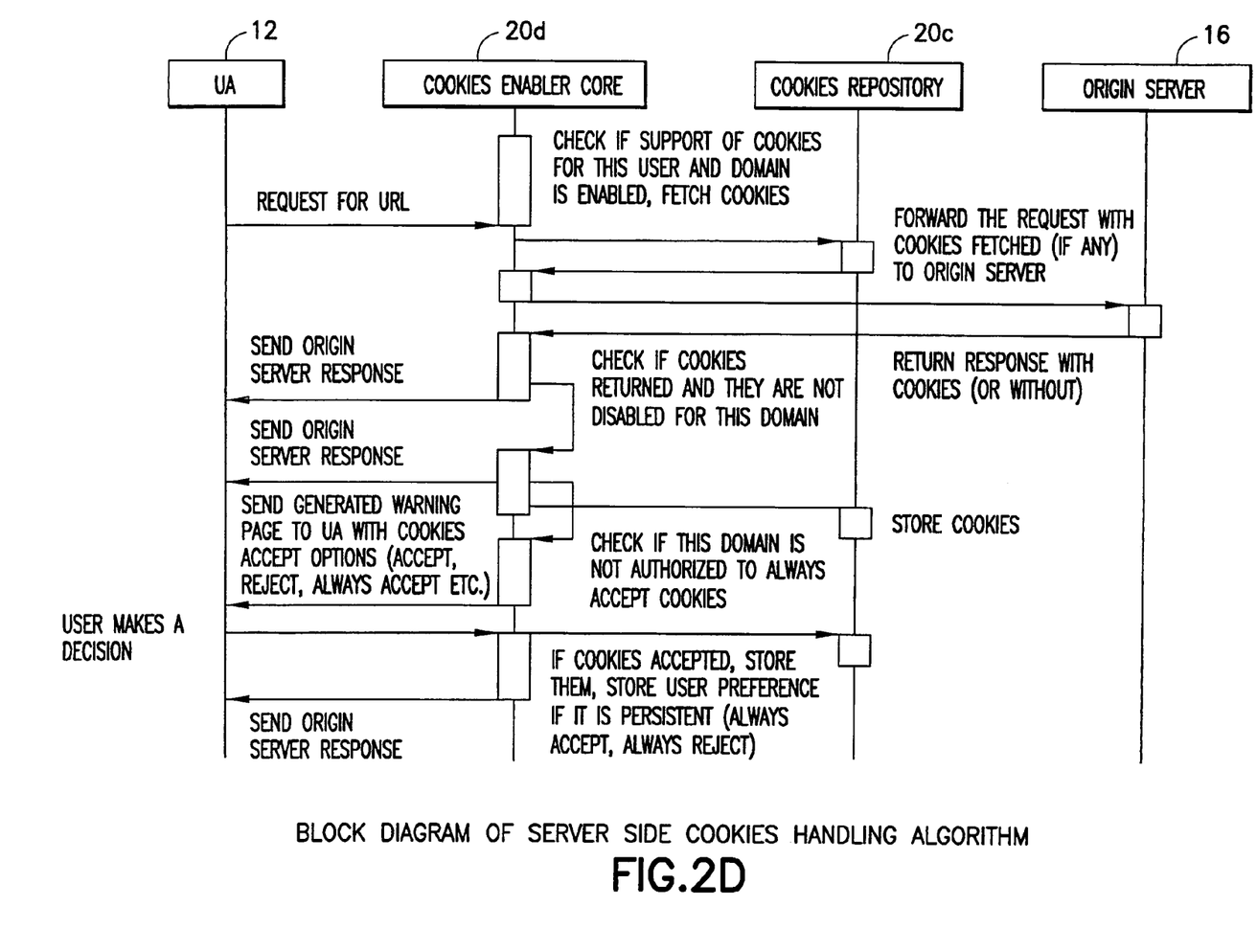
FIG. 2D is a block diagram of a server side cookies handling algorithm.

FIG. 2D: Server Side Cookie Handling Algorithm

FIG. 2D shows a block diagram of a cookies handling algorithm having steps which are discussed below:

As shown, upon receiving a request for a universal resource locator (URL) from the client, user or user agent 12, the cookies enabler core 20d checks if there is support of the cookies protocol for the client, user or user agent 12 and if the domain is enabled.

The cookies enabler core 20d also fetches cookies from the cookies repository 20c and forwards the request with cookies fetched, if any, to the origin server 16.

After receiving a response from the origin server 16 with cookies (or without), the cookies enabler core 20d checks if cookies were returned from the origin server 16 and that the cookies protocol is not disabled for the domain. The cookies enabler core 20d then sends the response received from the origin server 16 to the client, user or user agent 12, and stores the cookies, if any, in the cookie repository 20c.

Moreover, the cookies enabler core 20d can checks if the domain is not authorized to always accept cookies and sends the client, user or user agent 12 a generated warning page with one or more cookies accept options, including cookies accept options such as "accept," "reject," "always accept," "always reject", or a combination thereof. The client, user or user agent 12 may choose the one or more cookies accept options and forwards a decision to the cookies enabler core 20d, which stores the cookies if the cookies are accepted by the client, user or user agent 12, as well as storing user preferences in the cookies repository 20c if the cookies are accepted by the client, user or user agent 12 and the acceptance is a persistent acceptance, such as "always accept" or "always reject".

By way of example, the cookies enabler core 20d and the message generator 20b may be a component of a WAP Gateway, while the UA cookies database 20c may be deployed in a profile server. For the cookies management front end 20e, any web server may be used that supports scripting or module extensions.

FIGS. 3A–3D: Liberty Enabler

Figure 3A:
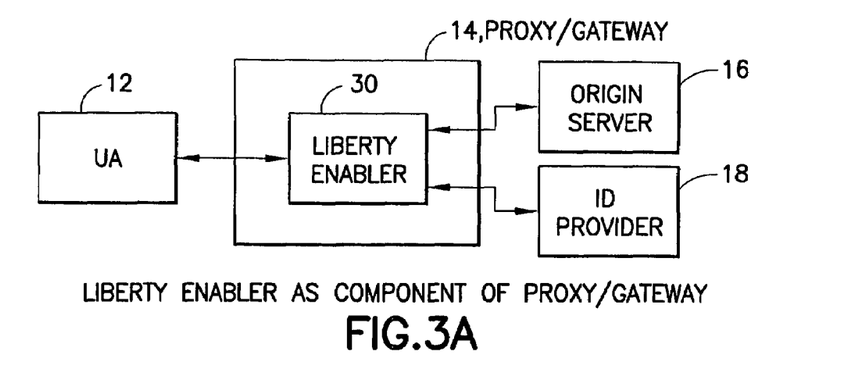
FIG. 3A is a block diagram of a liberty enabler as a component of a proxy/gateway in the network shown in FIG. 1.
Figure 3B:
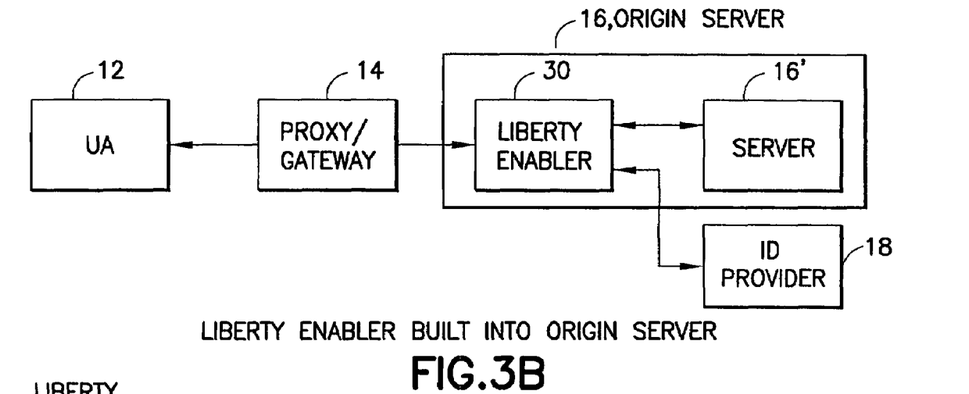
FIG. 3B is a block diagram of a liberty enabler built into an origin server in the network shown in FIG. 1.

FIGS. 3A and 3B show a liberty enabler generally indicated as 30 for enabling liberty-support services for particular clients, users and/or user agents in the wireless network 10 shown in FIG. 1. The liberty enabler 30 processes all connections between a client, user or user agent 12 and the origin server 16 and enables full user control over liberty acceptance and management for an end user 12.

FIG. 3A shows the liberty enabler 30 implemented in the proxy/gateway 14 for coupling the client, user or user agent 12 and the origin server 16 as well as an identification (ID) provider 18 in the wireless network 10 shown in FIG. 1.

FIG. 3B shows the liberty enabler 30 implemented in the origin server 16 having a server 16' for providing content to the client, user or user agent 12 in the wireless network 10 shown in FIG. 1 via the proxy/gateway 14. Similar to FIG. 3A, the liberty enabler 30 is also coupled to the identification (ID) provider 18.

Figure 3C:
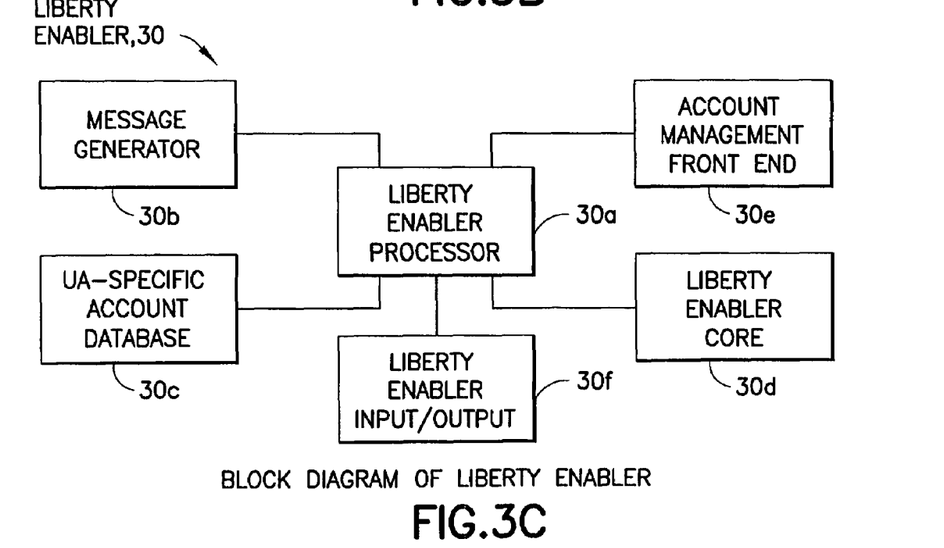
FIG. 3C is a block diagram of the liberty enabler shown in FIGS. 3A and 3B.

FIG. 3C: Liberty Enabler

FIG. 3C shows a diagram of the liberty enabler 30 having a liberty enabler processor 30a for coordinating a message generator 30b, a UA-specific account database 30c, a liberty enabler core 30d, a account management front end 30e and a liberty enabler input/output 30f.

The liberty repository or database 30c would not only be responsible for storing the names and passwords, but also for maintaining other relevant account settings.

Moreover, the account management front end 30e provides an interface that allows the user to log in and check his stored account names and passwords and manage them and the other relevant account settings.

The message generator 30b, UA-specific account database 30c, liberty enabler core 30d, account management front end 30e and liberty enabler input/output 30f may be implemented using hardware, software, or a combination thereof. The scope of the invention is not intended to be limited to any particular implementation thereof. For example, a typical software implementation may include using a microprocessor architecture having a microprocessor, a random access memory (RAM), a read only memory (ROM), an input/out devices and a control, address and databus for connecting the same.

The liberty enabler core 30d with the message generator 30b could be a component of, for example, a WAP Gateway, while the UA account database could be deployed in, for example, a profile server. For the cookies management front end 20e, any web server can be used that supports scripting or module extensions.

Figure 3D:
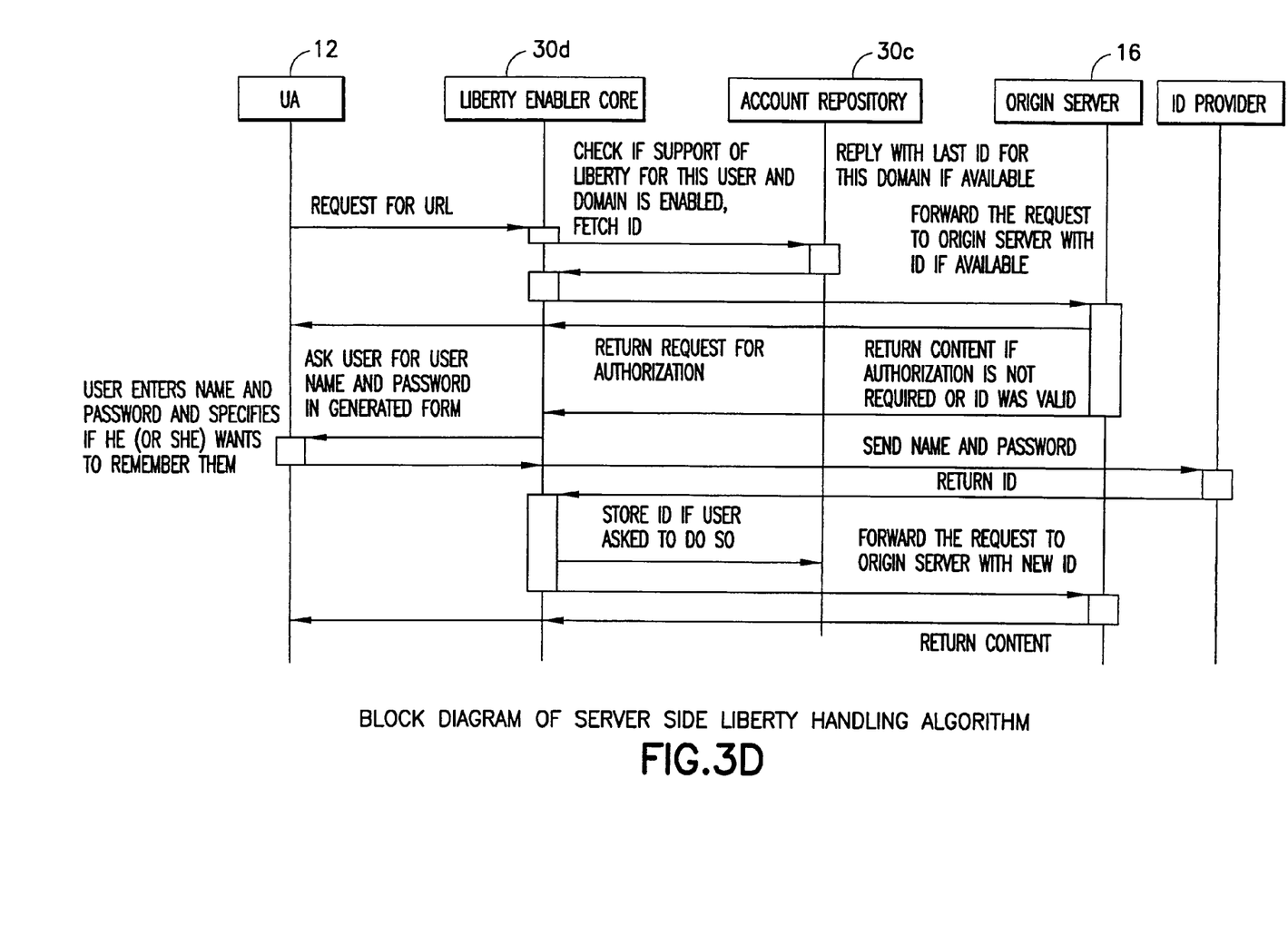
FIG. 3D is a block diagram of a server side liberty (via cookies) handling algorithm.

FIG. 3D: Server Side Liberty Handling Algorithm

FIG. 3D shows a block diagram of a liberty handling algorithm having steps which are discussed below:

As shown, upon receiving a request for a universal resource locator (URL) from the client, user or user agent 12, the liberty enabler core 30d checks if there is support of the liberty protocol for the client, user or user agent 12 and if he domain is enabled.

The liberty enabler core 30d also fetches a liberty identification (ID) from the account repository 30c, which sends to the liberty enabler core 30d a last liberty identification (ID) for the domain, if available.

The liberty enabler core 30d forwards the request with the liberty identification (ID), if available, to the origin server 16.

The liberty enabler core 30d receives return content from the origin server 16 if authorization is not required or the liberty identification (ID) was valid and provides the return content to the client, user or user agent 12.

The liberty enabler core 30d may also receive a request for authorization from the origin server 16 and ask the client, user or user agent 12 for a client or user name and password. In this case, the liberty enabler core 30d may receive the user name and password from the client, user or user agent 12 and send to the identification provider 18 the user name and password associated with the client, user or user agent 12. Moreover, the liberty enabler core 30d may receive an indication from the client, user or user agent 12 if the user name and password should be stored.

After receiving the name and password associated with the client, user or user agent from the identification provider 18, the liberty enabler core 30d forwards the request with a liberty identification (ID) to the origin server 16. The liberty enabler core 30d may also store the liberty identification (ID) if the client, user or user agent requested the same.

After receiving return content from the origin server 16, the liberty enabler core 30d provides the return content to the client, user or user agent 12.

FIGS. 4A–4D: Liberty Enabler (via Cookies)

Figure 4A:
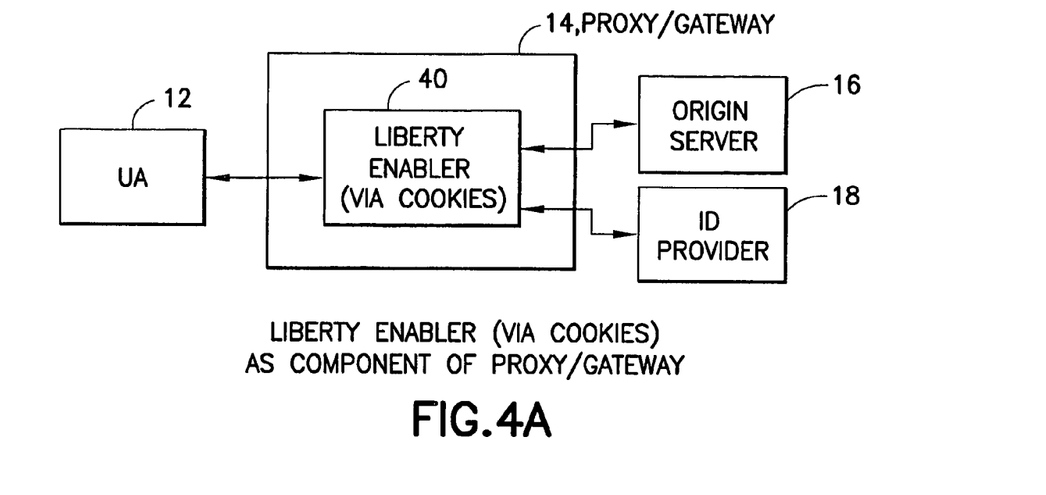
FIG. 4A is a block diagram of a liberty enabler as a component of a proxy/gateway in the network shown in FIG. 1.
Figure 4B:
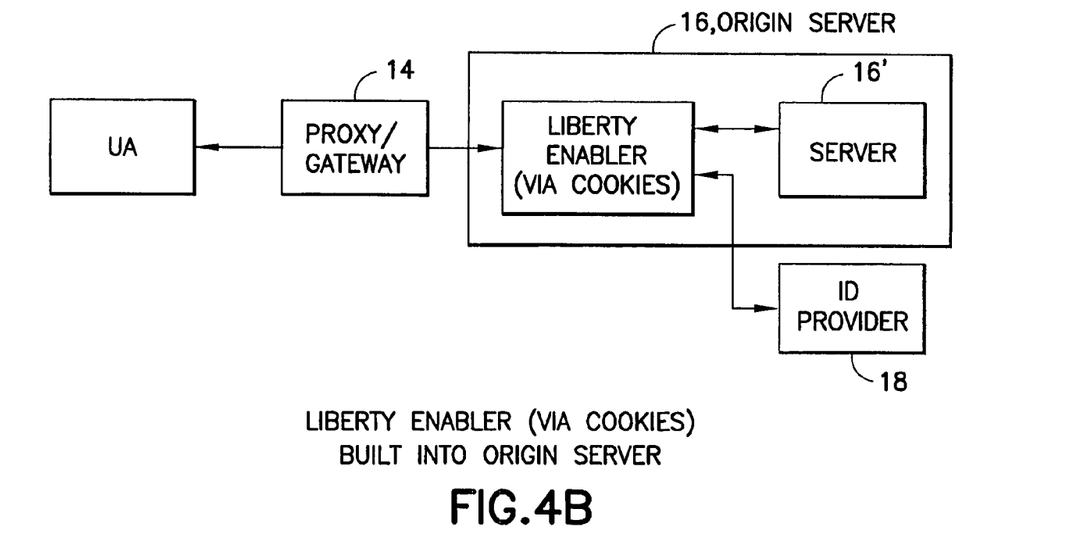
FIG. 4B is a block diagram of a liberty enabler built into an origin server in the network shown in FIG. 1.

FIGS. 4A and 4B show a liberty enabler (via cookies) generally indicated as 40 for enabling liberty-support services for particular clients, users and/or user agents in the wireless network 10 shown in FIG. 1. The liberty enabler (via cookies) 40 processes all connections between a client, user or user agent 12 and the origin server 16 and enables full user control over liberty acceptance and management for an end user 12.

FIG. 4A shows the liberty enabler (via cookies) 40 implemented in the proxy/gateway 14 for coupling the client, user or user agent 12 and the origin server 16 as well as the identification (ID) provider 18 in the wireless network 10 shown in FIG. 1.

FIG. 4B shows the liberty enabler (via cookies) 40 implemented in the origin server 16 for providing content to the client, user or user agent 12 in the wireless network 10 shown in FIG. 1 via the proxy/gateway 14. Similar to FIG. 4A, the liberty enabler (via cookies) 40 is also coupled to the identification (ID) provider 18.

Figure 4C:
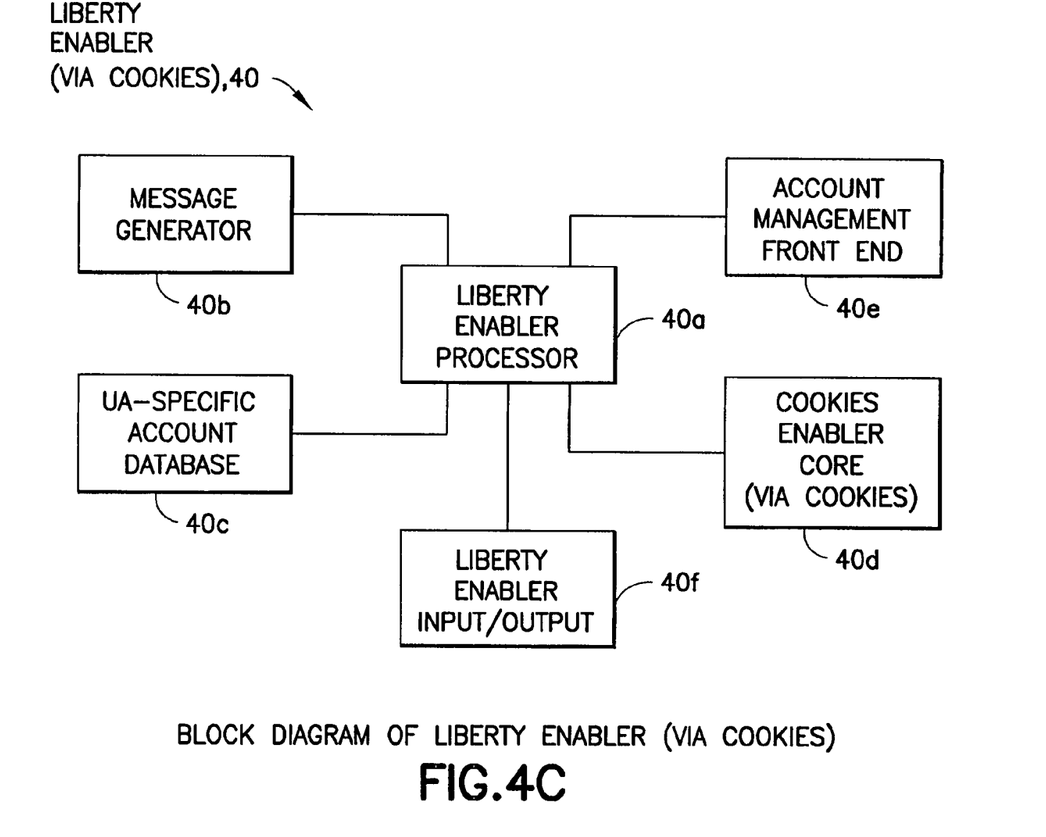
FIG. 4C is a block diagram of the liberty enabler shown in FIGS. 4A and 4B.

FIG. 4C: Liberty Enabler (via Cookies)

FIG. 4C shows a diagram of the liberty enabler (via cookies) 40 having a liberty enabler processor 40a for coordinating a message generator 40b, a UA-specific account database 40c, a liberty enabler core (via cookies) 40d, an account management front end 40e and a liberty enabler input/output 40f.

The functionality of the liberty enabler processor 40a and the message generator 40b is consistent with that discussed above. The liberty repository or database 40c would not only be responsible for storing the names and passwords, but also for maintaining other relevant account settings. The functionality of the liberty enabler core (via cookies) 40d is discussed below to the extent it differs from the functionality of the liberty enabler core 30d discussed above. The account management front end 40e provides an interface that allows the user to log in and check his stored account names and passwords and manage them and the other relevant account settings. The functionality of the liberty enabler input/output device 40f is consistent with that discussed above.

The message generator 40b, UA-specific account database 40c, liberty enabler core (via cookies) 40d, account management front end 40e and liberty enabler input/output 40f may be implemented using hardware, software, or a combination thereof. The scope of the invention is not intended to be limited to any particular implementation thereof. For example, a typical software implementation may include using a microprocessor architecture having a microprocessor, a random access memory (RAM), a read only memory (ROM), an input/out devices and a control, address and databus for connecting the same.

Figure 4D:
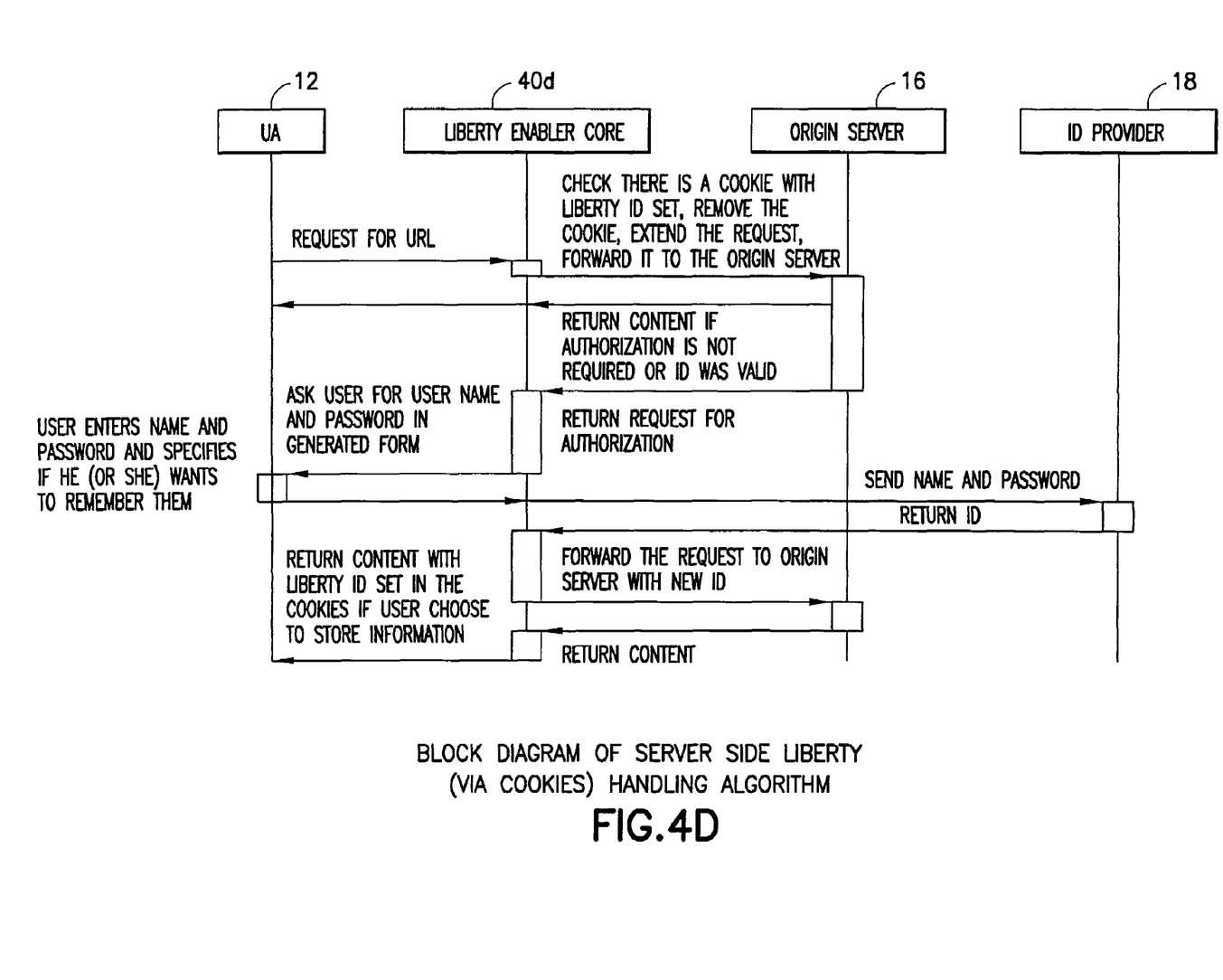
FIG. 4D is a block diagram of a server side liberty (via cookies) handling algorithm.

FIG. 4D: Server Side Liberty (via Cookie) Handling Algorithm

FIG. 4D shows a block diagram of a liberty (via cookies) handling algorithm having steps which are discussed below:

Only the steps that are different from that shown in FIG. 3D will be discussed below.

In FIG. 4D, the liberty enabler core 40d checks if there is a cookie with a liberty identification (ID) set, removes the cookie, extends the request, and forwards the request to the origin server 16.

After receiving return content from the origin server 16, the liberty enabler core 40d provides the return content to the client, user or user agent 12 with the liberty identification (ID) in cookies and stores the identification (ID) if the client, user or user agent 12 chooses to store the same.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

I claim:

1. A method comprising:
    processing all connections between a mobile terminal and an origin server in a Wireless Application Protocol (WAP) network through a cookies or liberty enabler that enables the cookies-support services, liberty-support services, or a combination thereof, for the mobile terminal in a wireless network with full user control over acceptance for an end user;
    checking if support of the cookies protocol for the mobile terminal and domain is enabled upon receiving a request for a universal resource locator (URL) from the mobile terminal;
    checking if the domain is not authorized to always accept cookies; and
    sending the mobile terminal generated warning page with one or more cookies accept options.

2. A method according to claim 1, wherein the method further comprises arranging the cookies or liberty enabler between the mobile terminal and the origin server.

3. A method according to claim 2, wherein the arranging further comprises arranging the cookies or liberty enabler as a component of a proxy/gateway.

4. A method according to claim 2, wherein the arranging further comprises building the cookies or liberty enabler into the origin server.

5. A method according to claim 1, wherein the method comprises fetching cookies from a cookies repository in the cookie enabler.

6. A method according to claim 5, wherein the method comprises forwarding the request with cookies fetched, if any, to the origin server.

7. A method according to claim 1, wherein the method comprises checking if cookies were returned from the origin server and that the cookies protocol is not disabled for the domain upon receiving a response from the origin server.

8. A method according to claim 7, wherein the method comprises sending the response received from the origin server to the mobile terminal.

9. A method according to claim 7, wherein the method comprises storing the cookies, if any, in a cookies repository.

10. A method according to claim 1, wherein the sending includes sending the one or more cookies accept options that includes: "accept," "reject," "always accept," "always reject", or a combination thereof.

11. A method according to claim 1, wherein the method comprises allowing the mobile terminal to choose the one or more cookies accept options.

12. A method according to claim 11, wherein the method comprises storing the cookies if the cookies are accepted by the mobile terminal.

13. A method according to claim 11, wherein the method comprises storing user preferences in the cookies repository if the cookies are accepted by the mobile terminal and the acceptance is a persistent acceptance, such as "always accept" or "always reject".

14. A method according to claim 1, wherein the method comprises allowing the user to log in and check their stored cookies and manage their stored cookies and other relevant cookies settings.

15. A method according to claim 1, wherein the method comprises checking if support of the liberty protocol for the mobile terminal and domain is enabled upon receiving a request for a universal resource locator (URL) from the mobile terminal.

16. A method according to claim 15, wherein the method comprises fetching a liberty identification (ID) from an account repository in a liberty enabler.

17. A method according to claim 16, wherein the method comprises sending from the account repository to the liberty enabler a last liberty identification (ID) for the domain, if available.

18. A method according to claim 17, wherein the method comprises forwarding the request with the liberty identification (ID), if available, to the origin server.

19. A method according to claim 18, wherein the method comprises receiving return content from the origin server if authorization is not required or the liberty identification (ID) was valid and providing the return content to the mobile terminal.

20. A method according to claim 18, wherein the method comprises receiving a request for authorization from the origin server and asking the mobile terminal for a client or user name and password.

21. A method according to claim 20, wherein the method comprises receiving the user name and password from the mobile terminal.

22. A method according to claim 21, wherein the method comprises receiving an indication from the mobile terminal if the user name and password should be stored.

23. A method according to claim 21, wherein the method comprises sending to an identification provider the user name and password associated with the mobile terminal.

24. A method according to claim 23, wherein the method comprises receiving the name and password associated with the mobile terminal from the identification provider and forwarding the request with a liberty identification (ID) to the origin server.

25. A method according to claim 24, wherein the method comprises receiving return content from the origin server and providing the return content to the mobile terminal.

26. A method according to claim 23, wherein the method comprises storing the liberty identification (ID) if the mobile terminal requested the same.

27. A method according to claim 1, wherein the method comprises allowing the user to log in and check their stored account names and passwords and manage the same and other relevant account settings.

28. A method according to claim 1, wherein the method comprises checking if there is a cookie with a liberty identification (ID) set, removing the cookie, extending the request, and forwarding the request to the origin server.

29. A method according to claim 28, wherein the method comprises receiving return content from the origin server and providing the return content to the client, user or user agent with the liberty identification (ID) in cookies if the mobile terminal chooses to store the information.

30. A method according to claim 1, wherein the method further comprises implementing the step of the method via a computer program running in a processing means in the cookies or liberty enabler.

31. A computer program product with a program code, which program code is stored on a computer readable medium, for carrying out the steps according to claim 1 when said computer program is run in a processing means in the cookies or liberty enabler.

32. A cookies or liberty enabler comprising:
a cookies or liberty enabler core configured for processing all connections between a mobile terminal and an origin server in a Wireless Application Protocol (WAP) network through the cookies or liberty enabler that enables the cookies-support services, liberty-support services, or a combination thereof, for the mobile terminal in a wireless network with full user control over acceptance for an end user, for checking if support of the cookies protocol for the mobile terminal and domain is enabled upon receiving a request for a universal resource locator (URL) from the mobile terminal, for checking if the domain is not authorized to always accept cookies, and for sending the mobile terminal generated warning page with one or more cookies accept options.

33. A cookies or liberty enabler according to claim 32, wherein the cookies or liberty enabler core enables full user control over cookies or liberty acceptance and management for an end user.

34. A proxy/gateway comprising:
one or more modules for coupling a mobile terminal and an origin server in a wireless network, having a cookies or liberty enabler for enabling cookies-support services, liberty-support services, or a combination thereof, for mobile terminals in the wireless network; the cookies and liberty enabler having a cookies or liberty enabler core configured for processing all connections between the mobile terminal and the origin server in a Wireless Application Protocol (WAP) network through the cookies or liberty enabler that enables the cookies-support services, liberty-support services, or a combination thereof, for the mobile terminal with full user control over acceptance for an end user, for checking if support of the cookies protocol for the mobile terminal and domain is enabled upon receiving a request for a universal resource locator (URL) from the mobile terminal, for checking if the domain is not authorized to always accept cookies, and for sending the mobile terminal generated warning page with one or more cookies accept options.

35. A proxy/gateway cookies or liberty enabler according to claim 34, wherein the cookies or liberty enabler core enables full user control over cookies or liberty acceptance and management for an end user.

36. An origin server comprising:
one or more modules for providing content to a mobile terminal in a wireless network via a proxy/gateway, having a cookies or liberty enabler for enabling cookies-support services, liberty-support services, or a combination thereof, for particular mobile terminals in the wireless network, the cookies and liberty enabler having a cookies or liberty enabler core configured for processing all connections between the mobile terminal and the origin server in a Wireless Application Protocol (WAP) network through the cookies or liberty enabler that enables the cookies-support services, liberty-support services, or a combination thereof, for the mobile terminal with full user control over acceptance for an end user, for checking if support of the cookies protocol for the mobile terminal and domain is enabled upon receiving a request for a universal resource locator (URL) from the mobile terminal, for checking if the domain is not authorized to always accept cookies, and for sending the mobile terminal generated warning page with one or more cookies accept options.

37. An origin server according to claim 36, wherein the cookies or liberty enabler core enables full user control over cookies or liberty acceptance and management for an end user.

38. A wireless network comprising:
 a proxy/gateway for coupling a mobile terminal to an origin server that provides content, having a cookies or liberty enabler arranged therein for enabling cookies-support services, liberty-support services, or a combination thereof, for particular mobile terminals in the wireless network,
 the cookies or liberty enabler configured for processing connections between the mobile terminal and the origin server in a Wireless Application Protocol (WAP) network that enables the cookies-support services, liberty-support services, or a combination thereof, for the mobile terminal with full user control over acceptance for an end user, for checking if support of the cookies protocol for the mobile terminal and domain is enabled upon receiving a request for a universal resource locator (URL) from the mobile terminal, for checking if the domain is not authorized to always accept cookies, and for sending the mobile terminal generated warning page with one or more cookies accept options.

39. A wireless network according to claim 38, wherein the cookies or liberty enabler enables full user control over cookies or liberty acceptance and management for an end user.

40. A wireless network according to claim 38, wherein the cookies or liberty enabler is arranged between the mobile terminal and the origin server.

41. A wireless network according to claim 38, wherein the cookies or liberty enabler is a component of the proxy/gateway.

42. A wireless network according to claim 38, wherein the cookies or liberty enabler is built into the origin server.

* * * * *